3,061,616
STEROIDS, 6-METHYL-17-HYDROXY-PROGESTER-
ONE AND ESTERS THEREOF, AND A PROCESS
FOR THEIR PREPARATION
Bruno Camerino and Renato Modelli, Milan, Bianca
Patelli, Stradella, and Giovanni Sala and Giuliana
Baldratti, Milan, Italy, assignors to Societa Farmaceu-
tici Italia, Milan, Italy, a corporation of Italy
No Drawing. Filed Sept. 17, 1958, Ser. No. 761,480
Claims priority, application Great Britain Apr. 24, 1958
5 Claims. (Cl. 260—397.4)

This invention relates to novel steroid compounds, and particularly those having a high progestative activity, superior to that of progesterone, with both oral and parenteral, viz. subcutaneous, administration, and to a process for obtaining them.

The invention provides compounds having the general formula:

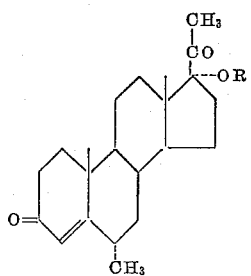

wherein R is a hydrogen atom or an acyl radical derived from an aliphatic or cycloaliphatic carboxylic acid containing not more than 9 carbon atoms, for example formic, acetic, propionic, butyric, valeric, caproic, oenanthic, caprylic, cyclopentylpropionic and cyclohexyl acetic acids.

Particular compounds provided by the invention are 6α-methyl-17α-hydroxyprogesterone, 6α-methyl-17α-hydroxyprogesterone-acetate, 6α-methyl-17α-hydroxyprogesterone-caproate, 6α-methyl-17α-hydroxyprogesterone oenanthate and 6α-methyl-17α-hydroxyprogesterone cyclopentyl propionate.

The invention is further concerned with a process for converting $\Delta^5$-pregnen-17α-ol-3,20-dione-bisethylene glycol ketal, or $\Delta^5$-pregnen-3β,17α-diol-20-one-ethylene glycol ketal to 6α-methyl-17α-hydroxyprogesterone and esters thereof.

The invention further provides a process for preparing 6α-methyl-17α-hydroxyprogesterone and esters thereof which may be illustrated by the following scheme:

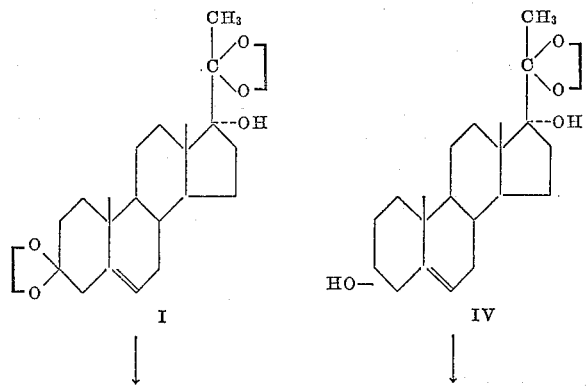

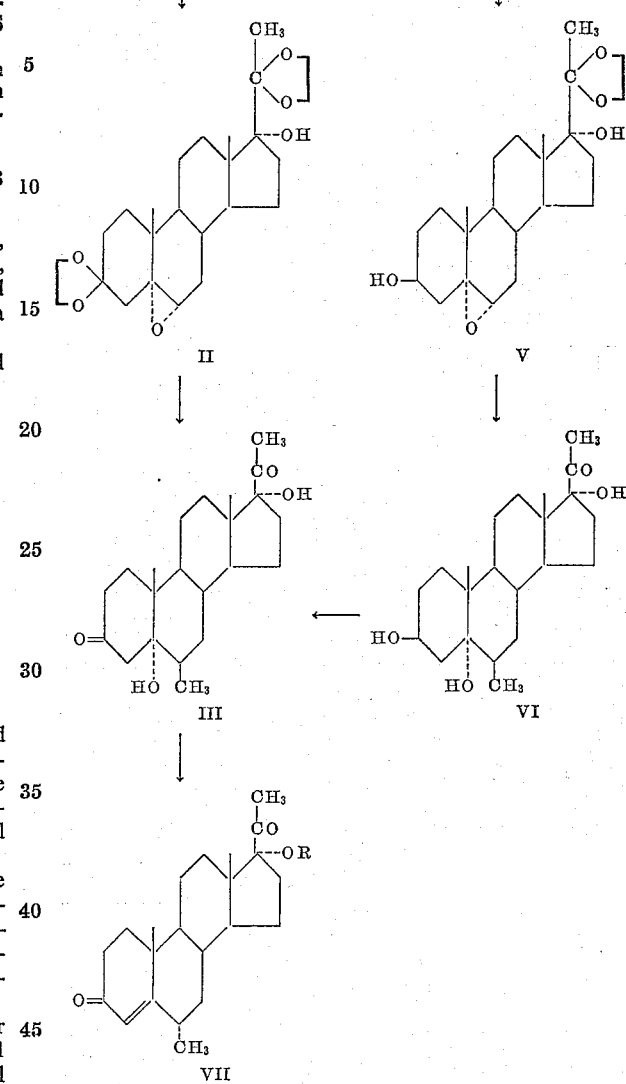

R=hydrogen or an acyl radical derived from an aliphatic or cycloaliphatic acid having not more than 9 carbon atoms.

Thus, $\Delta^5$-pregnen-17α-ol-3,20-dione-bis-ethylene glycol ketal (I) may be dissolved in an organic solvent and subjected to treatment with an organic peracid to bring about epoxidation of the double bond in position 5,6: in this way a mixture of α- and β-epoxides is obtained, from which the more laevo-rotatory 5α,6α-epoxide (II) is recovered on crystallization.

By reaction of the 5α,6α-epoxide (II) with methyl-magnesium iodide and subsequent hydrolysis of the 3,20-diketal groups with hot dilute acetic acid, the 6β methyl-allopregnan-5α,17α-diol-3,20-dione (III) is obtained.

The diol diketone (III) may alternatively be prepared from $\Delta^5$-pregnen-3β,17α-diol-20-one-ethylene glycol ketal (IV) by epoxidizing the double bond in position 5,6 with a peracid, then reacting the 5α,6α-epoxide (V) so obtained with methylmagnesium iodide and subsequently hydrolizing with dilute aqueous acetic acid in order to obtain the triol monoketone (VI); the latter, by oxidation with chromic acid, yields 6β-methyl-allopregnan-5α,17α- diol-3,20-dione (III). By treatment of (III) with strong alkalis, dehydration takes place with the formation of a 4,5 double bond and simultaneous isomerization of the 6β-methyl to 6α-methyl group, the compound 6α-methyl-17α-hydroxyprogesterone (VII, R=hydrogen), being obtained.

6α-methyl-17α-hydroxyprogesterone by treatment with aliphatic or cycloaliphatic acid chlorides or anhydrides having not more than 9 carbon atoms, in the presence of p-toluenesulphonic acid, or in an inert solvent such as benzene or toluene containing p-toluenesulphonic acid, and subsequent treatment with dilute mineral acids for the purpose of selectively hydrolizing the 3-enol-acylate which may have been formed, yields the 17-esters (VII, R=acyl radical).

$\Delta^5$-pregnen-17α-ol-3,20-dione-bisethylene glycol ketal and $\Delta^5$-pregnen-3β,17α-diol-20-one-ethylene glycol ketal, which constitute the starting compounds in the process of the present invention, may be easily prepared: the first compound by a method described by S. Bernstein, M. Heller and S. Stolar, J. Am. Chem. Soc. 76, 5674, 1954; and the second by a method described by P. L. Jullian, E. W. Meyer and I. Ryden in U.S. Patent 2,648,663 (to Glidden Co.) (C. A. 48, 7650, 1954).

The steps from I to II and from IV to V may be effected by treating the corresponding ketals I and IV at 0° C. with an organic peracid in a solution of a solvent which is resistant to peracids. Suitable peracids are peracetic, perbenzoic and perphthalic acids. As solvents chloroform, ethyl acetate or chlorobenzene, or a mixture thereof, may be used. After neutral washing of the organic solution and evaporation of the solvent a mixture of α- and β-5,6-epoxides may be obtained directly, in which the 5α,6α-form is more prevalent than the 5β,6β-form; from this mixture by crystallization from acetone, ethyl ether, benzene or other suitable solvents the 5α,6α-epoxides are separated.

The conversion of epoxides (II) and (V) to 6β-methyl-5α-hydroxy derivatives (III) and (VI) respectively may be effected by treatment with an excess of methylmagnesium iodide and subsequent hydrolysis with hot dilute acetic acid. The reaction with methylmagnesium iodide is preferably effected at room temperature in benzene, or in other aliphatic or aromatic hydrocarbons, and is completed within four to eight hours.

As the ketal protecting groups are very labile and may be partially removed during the attempted isolation of the Grignard reaction products, it has been found convenient to subject the crude reaction products to the action of dilute boiling aqueous acetic acid in concentrations varying from 50% to 90% in order to effect complete removal of the protecting ketal group and to obtain compounds (III) and (VI) directly. The oxidation of the hydroxyl group in position C-3 of compound (VI) to obtain the diol-diketone (III) is conveniently effected by using chromic acid as an oxidizing agent and acetic acid, or a mixture of acetic acid-ethylene dichloride as a solvent, or a mixture of chromic acid, sulphuric acid and water in acetone, operating preferably at a temperature not above 0° C.; the diol-diketone (III) is preferably isolated by extraction with an organic solvent and by crystallization from acetone.

The dehydration of (III) and simultaneous isomerization of the C-6 methyl group from position 6β to position 6α is effected by treatment with inorganic bases, for example with potassium hydroxide in methanol solution. 6α-methyl-17α-hydroxyprogesterone (VII, R=hydrogen), is crystallized directly from the solution after neutralization of the potassium hydroxide with acids and concentration to a small volume.

The esterification of the C-17α hydroxyl of (VII) (R=hydrogen) in order to obtain esters corresponding to the general Formula VII (R=an acyl radical) may be effected by treatment with aliphatic or cycloaliphatic acid chlorides or anhydrides having not more than nine carbon atoms, in the presence of p-toluenesulphonic acid with or without an inert solvent, such as benzene or toluene; at a temperature of from 80° to 125° C. The crude reaction product is subsequently treated with a dilute sulphuric acid solution in methanol at the boiling point for 1 to 2 hours in order to selectively hydrolyize the enolacylate which may have been formed. After solvent extraction, evaporation and crystallization the esters of 6α-methyl-17α-hydroxyprogesterone, having high progestative activity, may be obtained.

The high progestative activity of the compounds provided by the present invention, suggests their clinical usefulness for the following conditions: primarily amenorrhea, functional dysmenorrhea, hypo-oligomenorrhea, sterility, hemorrhages from follicle persistency, menorrhagia, metrorrhagia, habitual abortion, threatened abortion and antiovulatory action.

The following examples are given to illustrate the present invention.

*Example 1*

5α,6α-EPOXY-ALLOPREGNAN-17α-OL-3,20-DIONE-BIS-ETHYLENE GLYCOL KETAL (II)

To a solution of 3 g. of $\Delta^5$-pregnen-17α-ol-3,20-dione-bis-ethylene glycol ketal (I) having a melting point of 203-204° C., in 50 cc. of ethyl acetate and 20 cc. of chloroform, kept at 0° C., was added 1.5 g. of perbenzoic acid in 21 cc. of chloroform. The reaction mixture was allowed to stand at 0° C. for 4 hours, washed with 10% sodium bicarbonate solution, then with water to neutrality and the solvent evaporated. After crystallization of the residue from ether, there was obtained 1.2 g. of 5α,6α-epoxy allopregnan-17α-ol-3,20-dione-bis-ethylene glycol ketal (II), M.P. 178–180° C.; $(\alpha)_D = -52°$ (c.=1% in $CHCl_3$). Further crystallization from acetone gave needles melting at 210–212° C.; $(\alpha)_D = -62°$ (c.=1% in $CHCl_3$).

*Analysis.*—Calc. for $C_{25}H_{38}O_6$: C=69.09; H=8.81. Found: C=69.29; H=8.31.

*Example 2*

6β-METHYL-ALLOPREGNAN-5α,17α-DIOL-3,20-DIONE (III)

To a solution of 1.2 g. of 5α,6α-epoxy-allopregnan-17α-ol-3,20-dione-bis-ethylene glycol ketal (II), melting at 178–180° C., in 100 cc. of anhydrous benzene, 3 g. of magnesium and 7.8 cc. of methyl iodide in 30 cc. of anhydrous ether were added. The reaction mixture was allowed to stand overnight at room temperature and then refluxed for one hour on a steam bath. After cooling with ice, the excess of Grignard reagent was slowly decomposed with cold water and an aqueous solution of ammonium chloride. After separation of the organic phase and extraction of the aqueous phase with benzene, the combined benzene solutions were washed with 2 N HCl and then with water to neutrality and the organic solvent evaporated. The residue was heated for 2 hours at 100° C. with 14 cc. of aqueous 90% acetic acid. The cooled solution was diluted with water and extracted 3 times with methylene chloride and then washed with sodium carbonate and water to neutrality: after evaporation of the solvent the residue (0.8 g.) was dissolved in acetone, giving 6β-methyl-allopregnan-5α,17α-diol-3,20-dione (III), M.P. 265–267° C.

*Analysis.*—Calc. for $C_{22}H_{34}O_4$: C=72.89; H=9.45. Found: C=73.18; H=9.38.

*Example 3*

5α,6α-EPOXY-ALLOPREGNAN-3β,17α-DIOL-20-ONE-20-ETHYLENE GLYCOL KETAL (V)

To a solution of 3 g. of $\Delta^5$-pregnen 3β,17α-diol-20-one-20-ethylene glycol ketal (IV) in 500 cc. of pure chloroform, cooled to 0° C., 32 cc. of perbenzoic acid solution containing 52.8 g./cc. of peracid were added over a period of 10 minutes. The solution was kept at 0° C. for 6 hours, poured into a separatory funnel, washed with water, sodium carbonate and then again with water to neutrality. The residue (3.1 g.) remaining after evaporation of the solvent was recrystallized from ether, giving needles (2.1 g.) melting at 244–245° C.; $(\alpha)_D = -50°$ (c.=1.17% in dioxane).

*Analysis.*—Calc. for $C_{23}H_{36}O_5$: C=70.37; H=9.24. Found: C=70.18; H=9.32.

Example 4

5α,6α-EPOXY-ALLOPREGNAN-3β,17α-DIOL-20-ONE-20-ETHYLENE GLYCOL KETAL (V)

A solution of 5 g. of Δ⁵-pregnen-3β,17α-diol-20-one-20-ethylene glycol ketal (IV) in 800 cc. of chloroform, cooled to −10° C., was treated with 15 cc. of a 3.5 mol peracetic acid solution, then allowed to stand for 7 hours at a temperature below 0° C. It was then poured into 1 liter of water containing 5% sodium bisulphite and 5% sodium carbonate and the chloroform extract was washed to neutrality. Recrystallization of the residue from benzene gave needles (2.1 g.) melting at 238–245° C. There was no depression in melting point on admixture with the product from Example 3.

Example 5

6β-METHYL-ALLOPREGNAN-3β,5α,17α-TRIOL-20-ONE (VI)

To 22 g. of magnesium turnings were added portionwise 61 cc. of methyl iodide and 400 cc. of anhydrous ether. The mixture was refluxed for one hour in a stream of nitrogen; then 400 cc. of benzene were added and the solvent distilled completely, always in a stream of dry nitrogen. To the remaining Grignard reagent, cooled with an ice-salt bath, a hot solution of 8 g. of 5α,6α - epoxy - allopregnan - 3β,17α - diol - 20 - one-20-ethylene glycol ketal (V) in 800 cc. of benzene was added rather rapidly, in order to avoid crystallization of the substance during the addition of the solution. The mixture was stirred for 4 hours, then allowed to stand overnight. 1 kg. of iced water, containing 10 g. of $NH_4Cl$, was then added and the mixture stirred for one hour. The benzene extracts were washed with dilute HCl, then with 4% sodium bicarbonate solution and then with water to neutrality. The yellow oily residue remaining after evaporation of the solvent was dissolved in 100 cc. of aqueous 80% acetic acid and stirred for 2 hours at 100° C. The reaction product was extracted with methylene chloride, washed with sodium carbonate, then with water to neutrality and the solvent evaporated. The residue, after crystallization from acetone, afforded needles of 6β-methyl-allopregnan-3β,5α,17α-triol-20-one (VI) (2.1 g.) melting at 237–238° C.; $(\alpha)_D = +8°$ (c.=1% in dioxane).

*Analysis.*—Calc. for $C_{22}H_{36}O_4$: C=72.49; H=9.96. Found: C=72.12; H=10.31.

Example 6

6β-METHYL-ALLOPREGNAN-5α,17α-DIOL-3,20-DIONE (III)

To a solution of 1.5 g. of 6β-methyl-allopregnan-3β,5α,17α-triol-20-one (VI) in 300 cc. of acetone, kept at −10° C., were added, with stirring, 3.5 cc. of a solution of chromic acid in dilute $H_2SO_4$, prepared in the following way: 226 g. of chromic acid were dissolved in 400 cc. of water and 230 cc. of concentrated $H_2SO_4$ then diluted with water to one liter. The solution was allowed to stand at 0° C. for 7 hours and then extracted with methylene chloride, washed with sodium bisulphite and then with sodium bicarbonate to neutrality and the solvent evaporated. The residue, by crystallization from acetone, gave needles of 6β-methyl-allopregnan-5α,17α-diol-3,20-dione (III) melting at 265–267° C.; melting point on admixture with the product from Example 2: 265–267° C.

Example 7

6α-METHYL-17α-HYDROXYPROGESTERONE (VII, R=H)

0.5 g. of 6β - methyl - allopregnan - 5α,17α-diol-3,20-dione (III) were suspended in 300 cc. of methanol: to this suspension, a solution of 1 g. of KOH in 10 cc. of water and 50 cc. of methanol was added at room temperature. The mixture was left for 20 hours under nitrogen at room temperature, and stirred from time to time. The solution was then neutralized with acetic acid and the methanol evaporated almost completely. The residue was extracted with methylene chloride, the organic extract was washed with water and the solvent evaporated. The residue was dissolved in methanol and allowed to crystallize, giving needles of 6α-methyl-17α-hydroxyprogesterone (0.250 g.) (VII, R=H), melting at 234–235° C. $(\alpha)_D = +70°$ (c.=1% in dioxane), $\epsilon_{242} = 15,000$.

*Analysis.*—Calc. for $C_{22}H_{32}O_3$: C=76.70; H=9.36. Found: C=76.61; H=9.55.

Example 8

6α-METHYL-17α-HYDROXYPROGESTERONE ACETATE (VIII, R=COCH₃)

0.500 g. of 6α-methyl-17α-hydroxyprogesterone were heated for 30 minutes on a steam bath with 5 cc. of acetic anhydride and 15 mg. of paratoluene-sulphonic acid hydrate. The solution was kept at room temperature for 4 hours, then concentrated in vacuo. After addition of ice, the mixture was allowed to stand for 30 minutes and then extracted three times with ethyl acetate. The extract was washed with 10% sodium bicarbonate solution and then with water. The residue remaining after distillation of the solvent was refluxed for one hour with 330 cc. of methanol, 4.2 cc. of water and 2.1 cc. of sulphuric acid, in order to saponify the 3-enol-acetate eventually present. The solvent was concentrated, then diluted with water and extracted with ethyl acetate. The extract was washed with water to neurality and the solvent evaporated. The residue, after recrystallization from petroleum ether afforded 0.380 g. of 6α-methyl-17α - hydroxyprogesterone acetate (VII, R=COCH₃), M.P.=197–199° C., $\epsilon_{241} = 13,900$.

Example 9

6α-METHYL-17α-HYDROXYPROGESTERONE CAPROATE (VII, R=CO(CH₂)₄CH₃)

0.500 g. of 6α-methyl-17α-hydroxyprogesterone were introduced into a flask containing 20 cc. of anhydrous toluene, 1 g. of caproic anhydride and 20 mg. of paratoluene-sulphonic acid hydrate: the mixture was heated to 110° C. with stirring then kept at room temperature for 48 hours: 1 cc. of pyridine and 5 cc. of water were added and the mixture was stirred for one hour, then poured into water and extracted with toluene. The toluene solution was separated, washed with sodium carbonate solution, then with water, dried on sodium sulphate and evaporated. The residue was dissolved in 300 cc. of methanol containing 2 cc. of $H_2SO_4$ and 6 cc. of water and refluxed for 2 hours. The solution was neutralized with sodium bicarbonate and, after partial evaporation of the solvent, was extracted with benzene: the benzene extract was washed with water and the solvent evaporated. The residue, after chromaography, gave oily 6α-methyl-17α-hydroxyprogesterone caproate (VII, R=CO(CH₂)₄CH₃).

Example 10

6α-METHYL-17α-HYDROXYPROGESTERONE OENANTHATE (VII, R=CO(CH₂)₅CH₃)

6α-methyl-17α-hydroxyprogesterone (VII, R=H, was converted into the 17-oenanthate (VII, R=CO(CH₂)₅CH₃)

Example 11

6α-METHYL-17α-HYDROXYPROGESTERONE, CYCLOPENTYLPROPIONATE 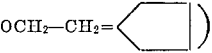 (VII, R=COCH₂—CH₂=)

The esterification of 6α-methyl - 17α - hydroxyprogesterone (VII, R=H), with cyclopentylpropionic anhydride was carried out in the same manner as described in the Example 9 for the caproic anhydride.

Example 12

PHARMACOLOGICAL ACTIVITY

Progestative effect was determined on immature rabbits, less than 1000 g. in weight, primed prior to the test with estradiol, according to McPhail's test (J. Physiol. 83, 145 (1934)). Activity on the endometrial carbonic anhydrase was determined according to the Lutwak Mann and Adams test (J. End. 15, 43 (1947)).

The results are summarized in the following table.

| Steroid | Method of administration | Total dose, mg. | Proliferation index | Endometrial carbonic anhydrase, u./g. |
|---|---|---|---|---|
| 6α-methyl-17α-hydroxyprogesterone acetate. | subcutaneously. | 0.062 | 3.8 | 124.4 |
| Do | per os | 0.125 | 2.4 | 64 |
|  |  | 0.250 | 3.4 | 71.4 |
|  |  | 1 | 3.7 |  |
| Progesterone | subcutaneously. | 0.5 | 2.4 | 90.5 |
|  |  | 1 | 3.8 | 138 |
|  |  | 5 | 1.8 | 57.3 |
| Ethynyltestosterone | per os | 10 | 2.8 |  |
|  |  | 20 | 3.4 | 127.6 |
| 17α-acetoxyprogesterone | per os | 2 | 1.5 | 59 |
|  |  | 5 | 2.4 | 62.9 |

The data in the table demonstrate that 6α-methyl-17α-hydroxyprogesterone acetate is about 15 times more active than progesterone when administered subcutaneously; when administered per os, it is 3.6 times more active than progesterone administered subcutaneously, 75 times more active than ethylnyltestosterone administered per os and 40 times more active than 17α-acetoxyprogesterone administered per os.

The coupling of the various compounds into the group formula set forth above is based upon the presence of a significant structural characteristic that is common to the group and which distinguishes it over the prior art. Functional equivalence is not necessariliy indicated thereby.

The acetate of Example 8 when further purified, by further recrystallization or by other methods, has the following physical characteristics:

Melting point: 203–205° C.

Rotatory power in chloroform $(\alpha)_{D20} = +60°$.

Absorption spectrum in the ultraviolet $= \lambda_{max.}^{ETOH}$ 241 mμ
$\epsilon = 15,760$.

6α-methyl-17α-hydroxyprogesterone acetate is the most potent progestational compound known up to now.

The potentiation of progestational effect and oral activity result both from the introduction of methyl group into 6-α-position and from the esterification of 17α-hydroxyl function.

Since 17α-acetoxyprogesterone has been shown to present oral activity, though in a slight or lesser degree, it may be assumed that 6α-methylation definitely increases the progestational effects. It also has an inhibitory effective on conception in the rabbit. It has antioestrogenic activity and is well tolerated both for acute and chronic administration.

We claim:
1. A process for making compounds of the formula

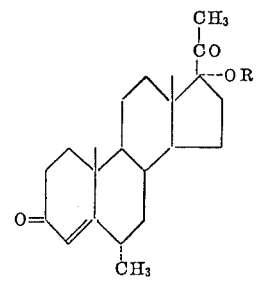

wherein R is an acyl radical derived from aliphatic and cycloaliphatic carboxylic acids containing up to and including nine carbon atoms, comprising dissolving Δ⁵-pregnen-3β,17α-diol-20-one-ethylene-glycol-ketal in a solvent resistant to peracids, selected from the group consisting of ethyl acetate, chloroform, chlorobenzene, and their mixtures, epoxidizing the double bond in 5,6 position by treating with an organic peracid selected from the group consisting of peracetic, perbenzoic and monoperphthalic acid, at a temperature of about 0° C., for 4–8 hours, to give a mixture of α and β-epoxides, and separating the α-epoxide by crystallization, treating the so obtained 5α,6α-epoxyallopregnan-3β,17α-diol-20-one-bis-ethylene - glycol-ketal with methyl magnesium iodide in an inert solvent, taken from the group consisting of benzene and ethyl ether, and their mixture, and then hydrolizing with hot dilute acetic acid, to obtain 6β-methyl-allopregnan-3β,5α,17α-triol-20-one, oxidizing the latter with a reagent comprising a member of the group consisting of chromic acid in acetic acid, and a mixture of chromic acid and sulphuric acid in acetone solution, at a temperature not above 0° C., to obtain 6β-methyl allopregnan-5α,17α-diol-3,20-dione, dehydrating and isomerizing the latter with potassium hydroxide in methanolic solution to obtain 6α-methyl-17α-hydroxyprogesterone, reacting the latter with a member of the group consisting of the halide and anhydride of an acid containing up to and including nine carbon atoms taken from the group consisting of aliphatic and cycloaliphatic acids, in the presence of p-toluene sulphonic acid as catalyst, at temperatures between 80 and 125° C., hydrolizing 3-enol acylate produced with boiling diluted sulphuric acid in methanol, to obtain the esters of 6α-methyl-17α-hydroxyprogesterone.

2. The reaction scheme for the production of the compound of the formula

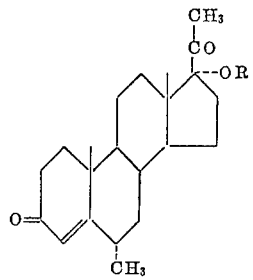

wherein R is an acyl radical derived from aliphatic and cycloaliphatic carboxylic acids containing up to and including nine carbon atoms, comprising converting Δ⁵-pregnen-3β,17α-diol-20-one-ethylene-glycol-ketal into a mixture of α- and β-5,6-epoxides by reaction with an epoxidizing agent comprising an organic peracid, separating the 5α,6α-epoxide, converting the latter epoxide into the compound 6β-methyl-allopregnan-3β,5α,17α-triol-20-one by treatment with a methyl magnesium halide followed by acidic hydrolysis of the ethylene-ketal group, oxidizing the latter into 6β-methyl-allopregnan-5α,17α-diol-3,20-dione with chromic acid, dehydrating and isomerizing the latter into 6α-methyl-17α-hydroxy-progesterone with alkali, acylating the latter with an acylating agent taken from the group consisting of the halide and anhydride of aliphatic and cycloaliphatic carboxylic acid containing up to nine carbon atoms followed by hydrolyzing the 3-enol-acylate produced as by-product with boiling diluted sulphuric acid, to obtain the 17-ester of 6α-methyl-17α-hydroxyprogesterone.

3. The process of claim 2, the oxidizing with chromic acid being at a temperature not above 0° C.

4. A process of making 6α-methyl-17α-hydroxyprogesterone, comprising dissolving Δ⁵-pregnen-3β,17α-diol-20-one-ethylene-glycol-ketal in a solvent resistant to peracids, selected from the group consisting of ethyl acetate, chloroform, chlorobenzene, and their mixtures, epoxidizing the double bond in 5.6 position by treating with an organic peracid selected from the group consisting of peracetic, perbenzoic and monoperphthalic acid, at a temperature of about 0° C., for 4–8 hours, to give a mixture of α and β-epoxides, and separating the α-epoxide by crystallization, treating the so obtained 5α,6α-epoxy-allopregnan-3β,17α-diol-20-one-mono-ethylene-glycol-ketal with methyl magnesium iodide in an inert solvent, taken from the group consisting of benzene and ethyl ether, and their mixture, and then hydrolyzing with hot diluted acetic acid, to obtain 6β-methyl-allopregnan-3β,5α,17α-triol-20-one, oxidizing the latter with a reagent comprising a member of the group consisting of chromic acid in acetic acid, and a mixture of chromic acid and sulphuric acid in acetone solution, at a temperature not above 0° C., to obtain 6β-methyl-allopregnan-5α,17α-diol-3,20-dione, dehydrating and isomerizing the latter with potassium hydroxide in methanolic solution to obtain 6α-methyl-17α-hydroxyprogesterone.

5. A process of preparing a 17-ester of 6α-methyl-17α-hydroxy progesterone, comprising dehydrating and isomerizing 6β-methyl-allopregnan-5α,17α-diol-3,20-dione into 6α-methyl-17α-hydroxy-progesterone with alkali, acylating the latter with an acylating agent taken from the group consisting of the halide and anhydride of aliphatic and cycloaliphatic carboxylic acid containing up to nine carbon atoms followed by hydrolyzing the 3-enol-acylate produced as byproduct with boiling diluted sulphuric acid, to obtain the 17-ester of 6α-methyl-17α-hydroxyprogesterone.

References Cited in the file of this patent

UNITED STATES PATENTS

| | | |
|---|---|---|
| 2,312,344 | Logemann | Mar. 2, 1943 |
| 2,753,360 | Kaspar | July 3, 1956 |
| 2,838,528 | Campbell | June 10, 1958 |
| 2,878,247 | Miramontes | Mar. 17, 1959 |
| 2,968,655 | Spero et al. | Jan. 17, 1961 |

OTHER REFERENCES

Turner: J.A.C.S. 75, July 20, 1953, pages 3489–3492.
J.A.C.S. I, 78, Dec. 5, 1956, page 6213.
Ringold: J. Org. Chem., January 1957, pages 99, 100.
J.A.C.S. II, 80, June 5, 1958, page 2904.